United States Patent
Chen et al.

(10) Patent No.: US 7,364,242 B2
(45) Date of Patent: Apr. 29, 2008

(54) MOUNTING APPARATUS FOR DATA STORAGE DEVICES

(75) Inventors: Yun-Lung Chen, Tu-Cheng (TW); Lin Ding, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 416 days.

(21) Appl. No.: 10/989,758

(22) Filed: Nov. 16, 2004

(65) Prior Publication Data

US 2005/0062375 A1   Mar. 24, 2005

(30) Foreign Application Priority Data

Dec. 8, 2003   (CN) .................. 2003 2 0119234 U

(51) Int. Cl.
*A47B 97/00* (2006.01)
(52) U.S. Cl. .................................. 312/223.2
(58) Field of Classification Search ............... 361/685, 361/725, 726; 312/223.1, 222, 223.2
See application file for complete search history.

(56) References Cited

U.S. PATENT DOCUMENTS

| | | | | |
|---|---|---|---|---|
| 2,514,246 A | * | 7/1950 | Knox ................... | 312/332.1 |
| 3,039,837 A | * | 6/1962 | Poe ..................... | 312/332.1 |
| 3,120,412 A | * | 2/1964 | Caldwell .............. | 312/332.1 |
| 5,020,151 A | * | 5/1991 | Sampei et al. ........ | 361/725 |
| 5,588,728 A | * | 12/1996 | Eldridge et al. ...... | 312/223.1 |
| 5,791,753 A | * | 8/1998 | Paquin ................. | 312/223.1 |
| 5,828,547 A | * | 10/1998 | Francovich et al. .. | 361/685 |
| 6,231,144 B1 | * | 5/2001 | Chen et al. .......... | 312/223.2 |
| 6,529,373 B1 | * | 3/2003 | Liao et al. ........... | 312/223.2 |
| 6,625,014 B1 | * | 9/2003 | Tucker et al. ........ | 312/223.1 |
| 6,737,577 B1 | * | 5/2004 | Liao et al. ........... | 174/50 |
| 6,826,044 B2 | * | 11/2004 | Gan et al. ............ | 361/685 |
| 2004/0032712 A1 | * | 2/2004 | Chen et al. .......... | 361/685 |

FOREIGN PATENT DOCUMENTS

| | | | | |
|---|---|---|---|---|
| JP | 03240299 | * | 10/1991 | ............ 361/685 |
| TW | 285393 | | 4/1992 | |
| TW | 190919 | | 9/1992 | |
| TW | 224797 | | 6/1994 | |

* cited by examiner

*Primary Examiner*—Janet M. Wilkens
*Assistant Examiner*—Hanh V. Tran
(74) *Attorney, Agent, or Firm*—Morris Manning Martin LLP; Tim Tingkang Xia, Esq.

(57) ABSTRACT

A mounting apparatus includes a chassis (10), a fixing member (50) and a bracket (30). The chassis includes a front panel (16), a side panel (14) and a mounting wall (18,19). An opening (20) is defined in the front panel. A fixing portion (28) is formed on the front panel close to the opening. The bracket includes a first sidewall (34) and a second sidewall (36,37,38). The fixing member pivotably secured to the bracket includes a body (52) and a retaining portion (54). An avoiding slot (56) is defined in the body at a bottom portion thereof. In assembly, the bracket slides in the chassis from the opening. The fixing member bestrides the front panel at a bottom of the opening through the avoiding slot. The fixing portion engages with the retaining portion. Data storage devices being received in the bracket are thus secured in the chassis.

14 Claims, 6 Drawing Sheets

MOUNTING APPARATUS FOR DATA STORAGE DEVICES

BACKGROUND OF THE INVENTION

1. Field of the Invention

The present invention relates to mounting apparatuses, and particularly to a mounting apparatus which readily secures data storages devices therein and allows convenient removal of the data storage devices therefrom.

2. Description of the Related Art

In the enclosure of a typical personal computer, there are generally two disk drive brackets mounted therein. Usually, a variety of disk drives are received in the disk drive brackets, which are then secured into the enclosure. There are many ways to secure the disk drive brackets in the enclosure. One way is by using screws. A pair of joining edges is formed on opposite sides of a bottom of a lower disk drive bracket. Fixing holes are defined in the joining edges. The lower disk drive bracket is secured to a bottom of an upper disk drive bracket by screws. However, this way of securing the disk drive brackets is unduly painstaking and time-consuming. Disassembly of the disk drive brackets is similarly painstaking and time-consuming.

Another way to secure the disk drive brackets in the enclosure is by using hooks. An example of a pertinent mounting apparatus for disk drive devices is disclosed in Taiwan patent application No. 81205427. One side of a first disk drive bracket has a plurality of L-shaped flanges and a plurality of L-shaped projections. A corresponding side of a second disk drive bracket has a plurality of L-shaped projections and a plurality of L-shaped flanges, respectively corresponding to the L-shaped flanges and L-shaped projections of the first disk drive bracket. Each flange fastens to the corresponding projection. Thus the second disk drive bracket is secured to the first disk drive bracket. This mounting apparatus does not need screws. However, the disk drive brackets must be assembled by hand inside the computer enclosure. Thus makes the assembly operation inconvenient, and increases the risk of accidental damage to other components such as sensitive electronic components inside the computer enclosure.

Thus an improved mounting apparatus which overcomes the above-mentioned problems is desired.

SUMMARY OF THE INVENTION

Accordingly, an object of the present invention is to provide a mounting apparatus which readily secures data storages devices therein and allows convenient removal of the data storage devices therefrom.

To achieve the above-mentioned object, a mounting apparatus for accommodating data storage devices therein comprises a chassis, a bracket and a fixing member. The chassis comprises a front panel, a side panel and a mounting wall parallel to the side panel. The front panel defines an opening therein. A fixing portion is formed on the front panel close to the opening. The bracket adapted for holding the data storage devices comprises a first sidewall and a second sidewall. The fixing member pivotably secured to the second sidewall of the bracket at an outer comprises a body and a retaining portion extending from the body. An avoiding slot is defined in the body at a bottom thereof. In assembly, the bracket slides in the chassis from the opening thereof. The fixing member bestrides the front panel at a bottom of the opening through the avoiding slot. The fixing portion of the front panel engages with the retaining portion of the fixing member. Thus, the data storage devices are secured in the chassis.

Other objects, advantages and novel features of the present invention will be drawn from the following detailed description of a preferred embodiment of the present invention with attached drawings, in which:

DETAILED DESCRIPTION OF THE INVENTION

Figure 1:
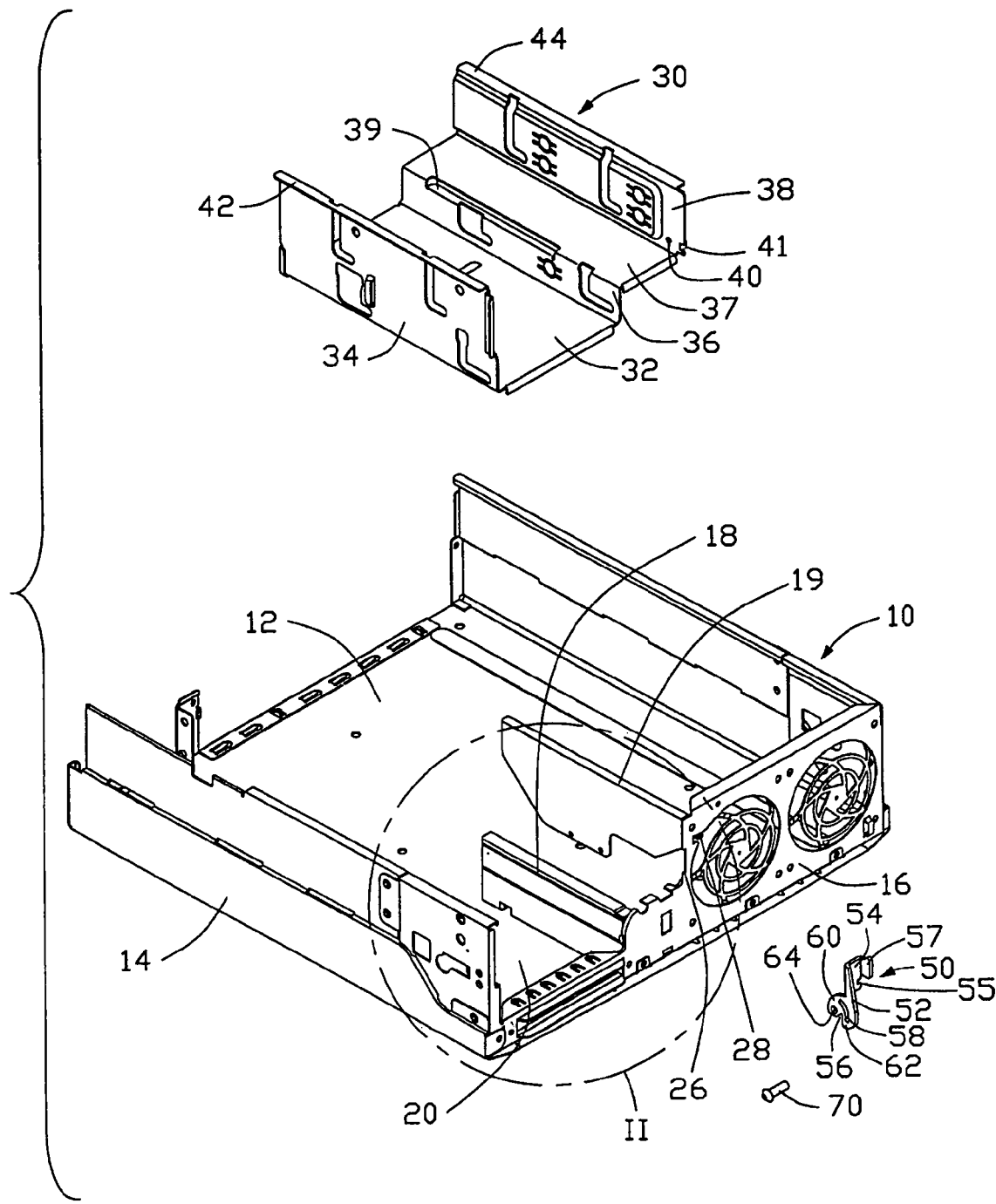
FIG. 1 is an exploded, isometric view of a mounting apparatus in accordance with the preferred embodiment of present invention, the mounting apparatus comprising a chassis, a bracket and a fixing member.
Figure 2:
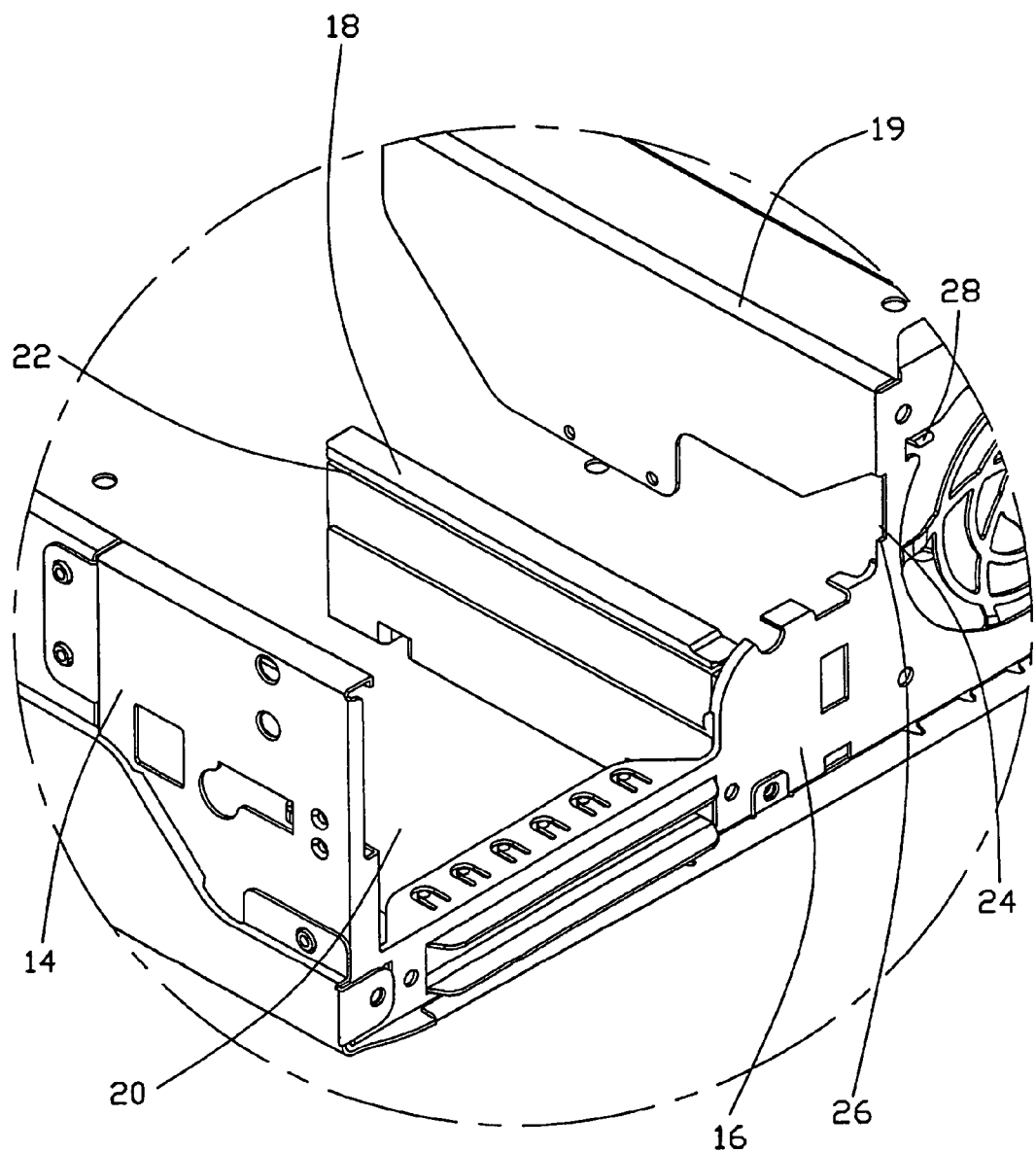
FIG. 2 is an enlarged view of part II in FIG. 1.
Figure 3:
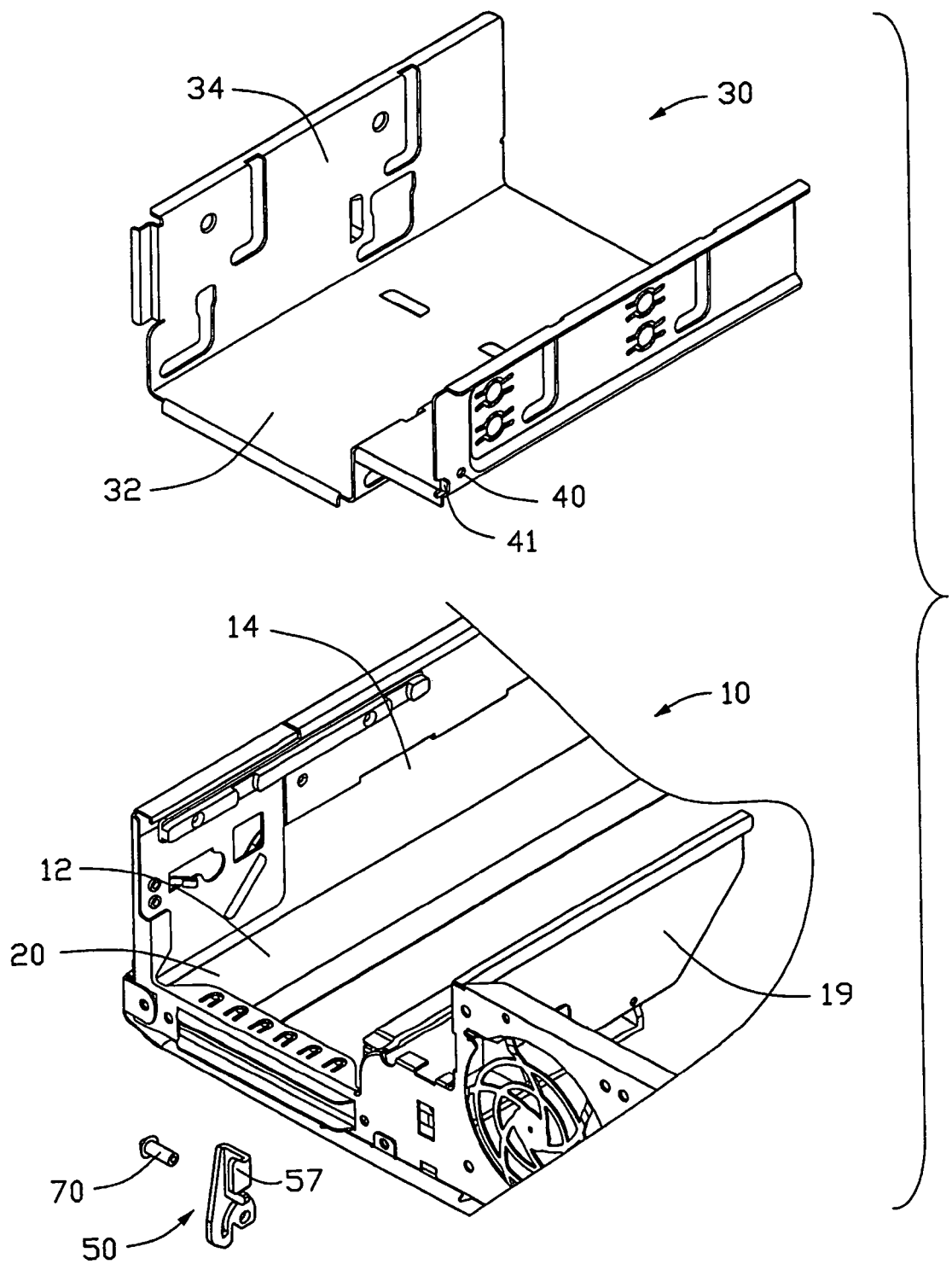
FIG. 3 is an exploded, isometric view of the mounting apparatus, but viewed from another aspect, with the chassis being partly cut away.

Referring to FIGS. 1 to 3, a mounting apparatus of an electronic device in accordance with the preferred embodiment of the present invention is used to accommodate a plurality of data storage devices (not shown) therein. The mounting apparatus comprises a chassis 10, a drive bracket 30 and a fixing member 50.

The chassis 10 comprises a bottom panel 12, a front panel 16 extending upwardly from a front edge of the bottom panel 12, a side panel 14 extending upwardly from a side of the bottom panel 12, a first mounting panel 18 extending perpendicularly from the bottom panel 12, and a second mounting panel 19 bent rearward from the front panel 16 and parallel to the first mounting panel 18 . An opening 20 is formed in the front panel 16 after the second mounting panel 19 being bent from the front panel 16. A slot 22 is defined in the first mounting panel 18 and perpendicular to the front panel 16. A gap 24 is defined in the front panel 16 at an edge of the opening 20 adjacent to the second mounting panel 19. A block portion 26 is formed at a bottom of the gap 24. A fixing portion 28 protrudes from the front panel 16 adjacent to the gap 24.

The fixing member 50 comprises a body 52 and a retaining portion 54 extending perpendicularly from a rear portion of the body 52. A block gap 55 is defined in the retaining portion 54 at a bottom portion thereof for receiving the fixing portion 28 of the chassis 10. An operation part 57 is bent forwardly perpendicularly from an upper portion of the retaining portion 54 and parallel to the body 52. An avoiding gap 56 is defined in the body 52 at a bottom portion thereof. An arc-shaped sliding slot 58 is defined in the body 52. A rotation portion 60 is formed on the body 52 at a rear side of the avoiding gap 56, with a first rotation hole 64 being defined therein. A resisting portion 62 is formed on the body 52 at a front side of the avoiding gap 56.

The bracket 30 comprises a bottom wall 32, a first sidewall 34 and a second sidewall (not labeled) extending upwardly from both opposite sides of the bottom wall 32. The second sidewall comprises a first vertical wall 36, a horizontal wall 37 and a second vertical wall 38. A sliding flange 39 is stamped outwardly perpendicularly to the first vertical wall 36 from a top of the first vertical wall 36. A sliding tab 41 protrudes outwardly from the second vertical wall 38 at a front portion corresponding to the sliding slot 58 of the fixing member 50. A second rotation hole 40 is defined in the second vertical wall 38 close to the sliding tab 41, corresponding to the rotation hole 64 of the fixing member 50. Flanges 42, 44 are bent outwardly respectively from tops of the first sidewall 34 and the second vertical wall 38.

Figure 4:
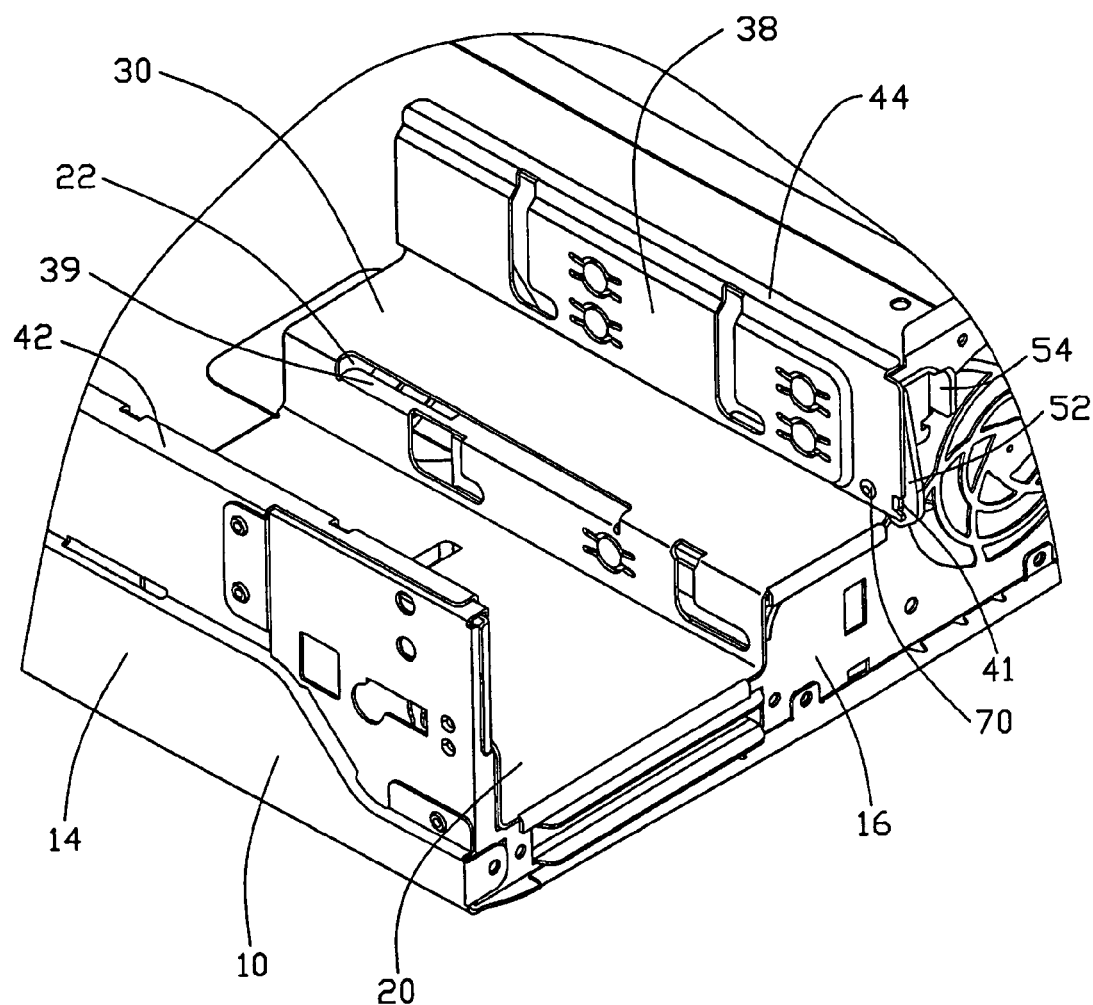
FIG. 4 is an assembled view of FIG. 1, partly cut away.
Figure 5:
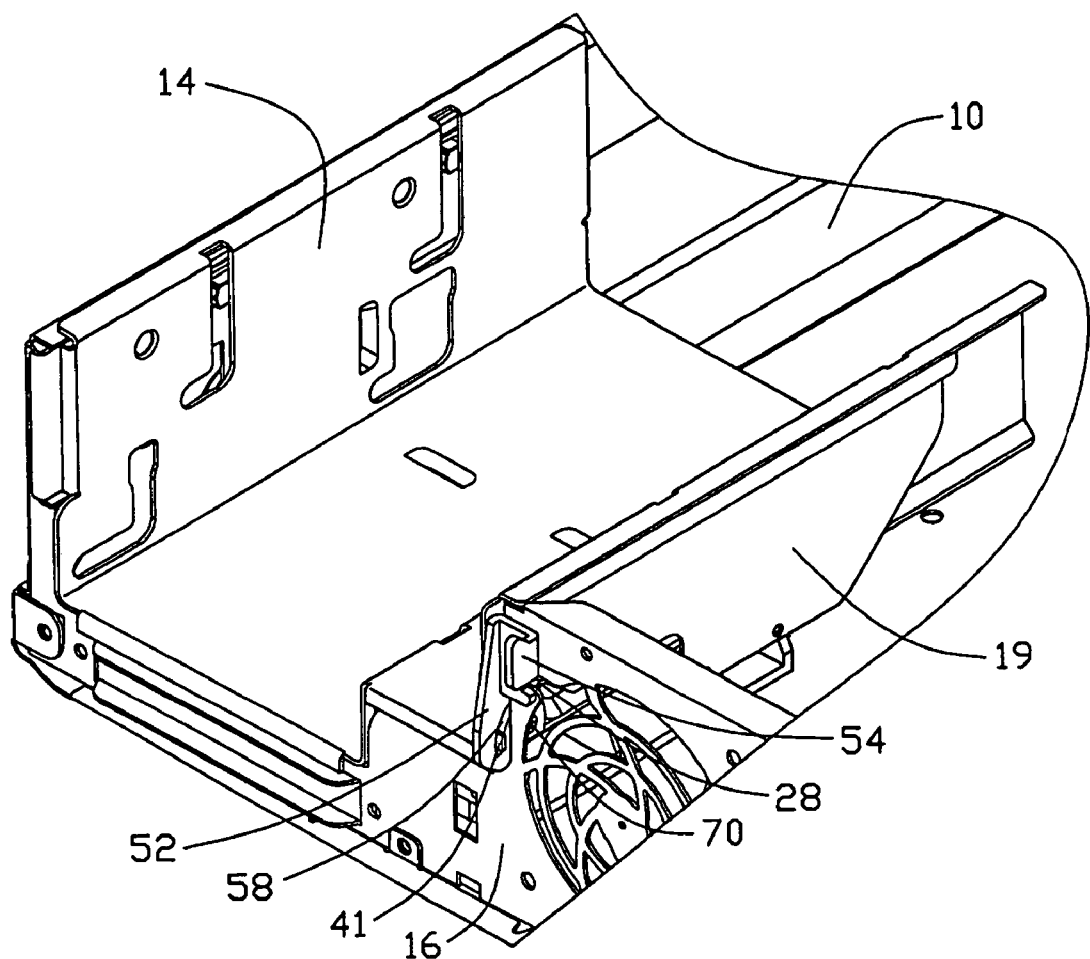
FIG. 5 is an assembled view of FIG. 3, partly cut away.

Referring also to FIGS. 4 and 5, in assembly, a rivet 70 is inserted through the rotation holes 64, 40 to pivotably secure the fixing member 50 to the second vertical wall 38 of the bracket 30 at an outer side. The sliding tab 41 of the bracket 30 is slidably received in the sliding slot 58 of the fixing member 50. The combined bracket 30 and fixing member 50 is placed in the chassis 10 through the opening 20 of the front panel 16, with the sliding flange 39 being put in the slot 22 and the flanges 42, 44 being put on the first sidewall 14 and the second mounting wall 19 respectively. The fixing member 50 bestrides the block portion 26 of the front panel 16 of the chassis 10 via the avoiding gap 56, with the rotation portion 60 being located at an inner side of the chassis 10 and the resisting portion 62 being located at an outer side of the chassis 10. The bracket 30 is pushed rearward, with the sliding tab 41 sliding in the slot 58 of the fixing member 50. The fixing member 50 rotates rearward. The operation part 57 of the fixing member 50 is pushed toward the front panel 16 of the chassis 10. Then the fixing portion 28 of the chassis 10 is received in the block gap 55. Thus, the data storage devices mounted on the bracket 30 is secured to the chassis 10.

Figure 6:
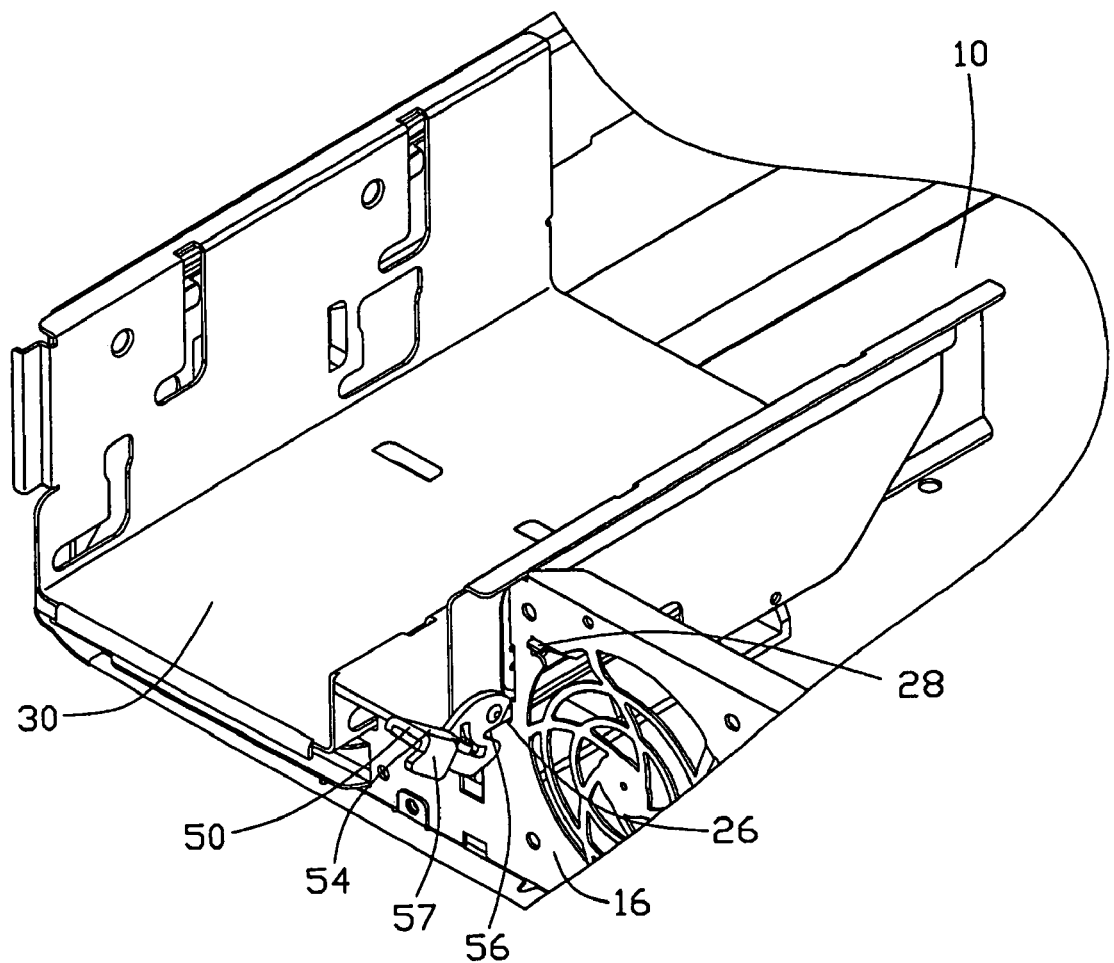
FIG. 6 is similar to FIG. 5, but showing the fixing member in an unlocked position.

Referring also to FIG. 6, in disassembly, the operation part 57 of the fixing member 50 is released from the fixing portion 28 of the chassis 10. The body 52 of the fixing member 50 pivots forwardly around the resisting portion 62. The bracket 30 pivots forwardly along with the rotation portion 60 of the fixing member 50. Because the sliding flange 39 is sliding in the slot 22 of the first mounting panel 18, the chassis moves forwardly only. During pivotation of the fixing member 50, the resisting portion 62 of the fixing member 50 depends on the front panel 16 of the chassis 10. After the rotation portion 60 of the fixing member 50 locates the outer of the chassis 10, the bracket 30 moves a distance forwardly. Thus, the bracket 30 is pulled from the chassis 10.

It is to be understood, however, that even though numerous characteristics and advantages of the present invention have been set fourth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

What is claimed is:

1. A mounting apparatus for accommodating data storage devices therein, the mounting apparatus comprising:
   a chassis comprising a front panel, a side panel and a mounting wall parallel to the side panel, the front panel defining an opening therein, a fixing portion being formed on the front panel close to the opening;
   a bracket adapted for holding the data storage devices comprising a first sidewall and a second sidewall; and
   a fixing member pivotably secured to an outer side of the second sidewall of the bracket comprising a body and a retaining portion extending from the body, an avoiding gap being defined in the body at a bottom portion thereof, a rotation portion and a resisting portion of the body being formed at a rear side and a front side of the avoiding gap respectively;
   wherein said bracket slides in the chassis from the opening thereof, the fixing member bestrides the front panel at a bottom of the opening via the avoiding gap, with the rotation portion being located at an inner side of the chassis and the resisting portion being located at an outer side of the chassis, the fixing portion of the front panel engages with the retaining portion of the fixing member for thereby securing the data storage devices in the bracket;
   wherein the chassis further comprises a bottom panel, the mounting wall comprises a first mounting panel and a second mounting panel, the side panel and the first mounting panel extend upwardly from the bottom panel, the bracket further comprises a bottom wall, the first sidewall and the second sidewall extend upwardly from both opposite sides of the bottom wall; and
   wherein the second sidewall of the bracket comprises a first vertical wall, a horizontal wall and a second vertical wall, a slot is defined in the first mounting panel and perpendicular to the front panel, a sliding flange is stamped outwardly from a top of the first vertical wall perpendicularly to the first vertical wall, corresponding to the slot of the first mounting panel.

2. The mounting apparatus as described in claim 1, wherein a blocking gap is defined in the retaining portion of the fixing member at a bottom portion thereof for receiving the fixing portion of the chassis.

3. The mounting apparatus as described in claim 1, wherein an operation part is bent forwardly perpendicularly from an upper portion of the retaining portion an parallel to the body.

4. The mounting apparatus as described in claim 1, wherein flanges are bent outwardly from tops of the first sidewall and the second vertical wall corresponding to the side panel of the chassis and the second mounting panel respectively.

5. The mounting apparatus as described in claim 1, wherein the fixing member is pivotably secured to the bracket via the rotation portion, a gap is defined in the front panel at an edge of the opening for allowing the rotation portion of the fixing member locating at a rear side of the front panel and the resisting portion of the fixing member locating at a front side of the front panel.

6. The mounting apparatus as described in claim 5, wherein an arc-shaped sliding slot is defined in the body of the fixing member, a sliding tab protrudes outwardly from the second vertical wall at a front portion corresponding to the sliding slot of the fixing member.

7. An enclosure comprising:
   a chassis comprising a front panel, a side panel and a mounting wall parallel to the side panel, the front panel defining an opening therein, a fixing portion being formed on the front panel close to the opening;
   a bracket adapted for holding data storage devices therein comprising a first sidewall and a second sidewall; and
   a fixing member comprising a body and a retaining portion extending from the body, a rotation portion and a resisting portion being formed on the body at a bottom portion thereof, the fixing member being pivotably secured to an outer side of the second sidewall of the bracket via the rotation portion and resisted against the front panel;
   wherein said bracket slides in the chassis from the opening thereof, the rotation portion of the fixing member locates at a rear of the front panel, the resisting portion of the fixing member locates at a front of the front panel, the fixing portion of the front panel engages with the retaining portion of the fixing member for thereby securing the data storage devices in the bracket;

wherein the chassis further comprises a bottom panel, the mounting wall comprises a first mounting panel and a second mounting panel, the bracket further comprises a bottom wall, the first sidewall and the second sidewall extend upwardly from both opposite sides of the bottom wall, the second sidewall of the bracket comprises a first vertical wall, a second vertical wall and a horizontal wall connecting the first vertical wall with the second vertical wall; and wherein an arc-shaped sliding slot is defined in the body of the fixing member, a sliding tab protrudes outwardly from the second vertical wall at a front portion corresponding to the sliding slot of the fixing member.

8. The enclosure as described in claim 7, wherein a blocking gap is defined in the retaining portion of the fixing member at a bottom portion thereof for receiving the fixing portion of the chassis.

9. The enclosure as described in claim 7, wherein an operation part is bent forwardly perpendicularly from an upper portion of the retaining portion and parallel to the body.

10. The enclosure as described in claim 7, wherein flanges are bent outwardly from tops of the first sidewall and the second vertical wall corresponding to the side panel of the chassis and the second mounting wall respectively.

11. The enclosure as described in claim 7, wherein a slot is defined in the first mounting panel and perpendicular to the front panel, a sliding flange is stamped outwardly from a top of the first vertical wall perpendicularly to the first vertical wall, corresponding to the slot of the first mounting panel.

12. The enclosure as described in claim 7, wherein a gap is defined in the front panel at an edge of the opening adjacent to the second mounting panel for allowing the rotation portion of the fixing member locating at a rear side of the front panel and the resisting portion of the fixing member locating at a front side of the front panel.

13. The enclosure as described in claim 12, wherein an avoiding gap is defined in the body of the fixing member at a bottom portion thereof, the rotation portion is formed on the body at a rear side of the avoiding gap, the resisting portion is formed on the body at a front side of the avoiding gap.

14. An enclosure comprising:

a chassis comprising a front panel, a side panel and a mounting wall parallel to the side panel, the front panel defining an opening therein, a fixing portion being formed on the front panel close to the opening;

a bracket adapted for holding data storage devices therein comprising a first sidewall and a second sidewall; and a fixing member comprising a body and a retaining portion extending from the body, a rotation portion and a resisting portion being formed on the body at a bottom portion thereof, the fixing member being pivotably secured to an outer side of the second sidewall of the bracket via the rotation portion and resisted against the front panel;

wherein said bracket slides in the chassis from the opening thereof, the rotation portion of the fixing member locates at a rear of the front panel, the resisting portion of the fixing member locates at a front of the front panel, the fixing portion of the front panel engages with the retaining portion of the fixing member for thereby securing the data storage devices in the bracket;

wherein the chassis further comprises a bottom panel, the mounting wall comprises a first mounting panel and a second mounting panel, the bracket further comprises a bottom wall, the first sidewall and the second sidewall extend upwardly from both opposite sides of the bottom wall, the second sidewall of the bracket comprises a first vertical wall, a second vertical wall and a horizontal wall connecting the first vertical wall with the second vertical wall; and wherein a slot is defined in the first mounting panel and perpendicular to the front panel, a sliding flange is stamped outwardly from a top of the first vertical wall perpendicularly to the first vertical wall, corresponding to the slot of the first mounting panel.

* * * * *